Patented May 5, 1925.

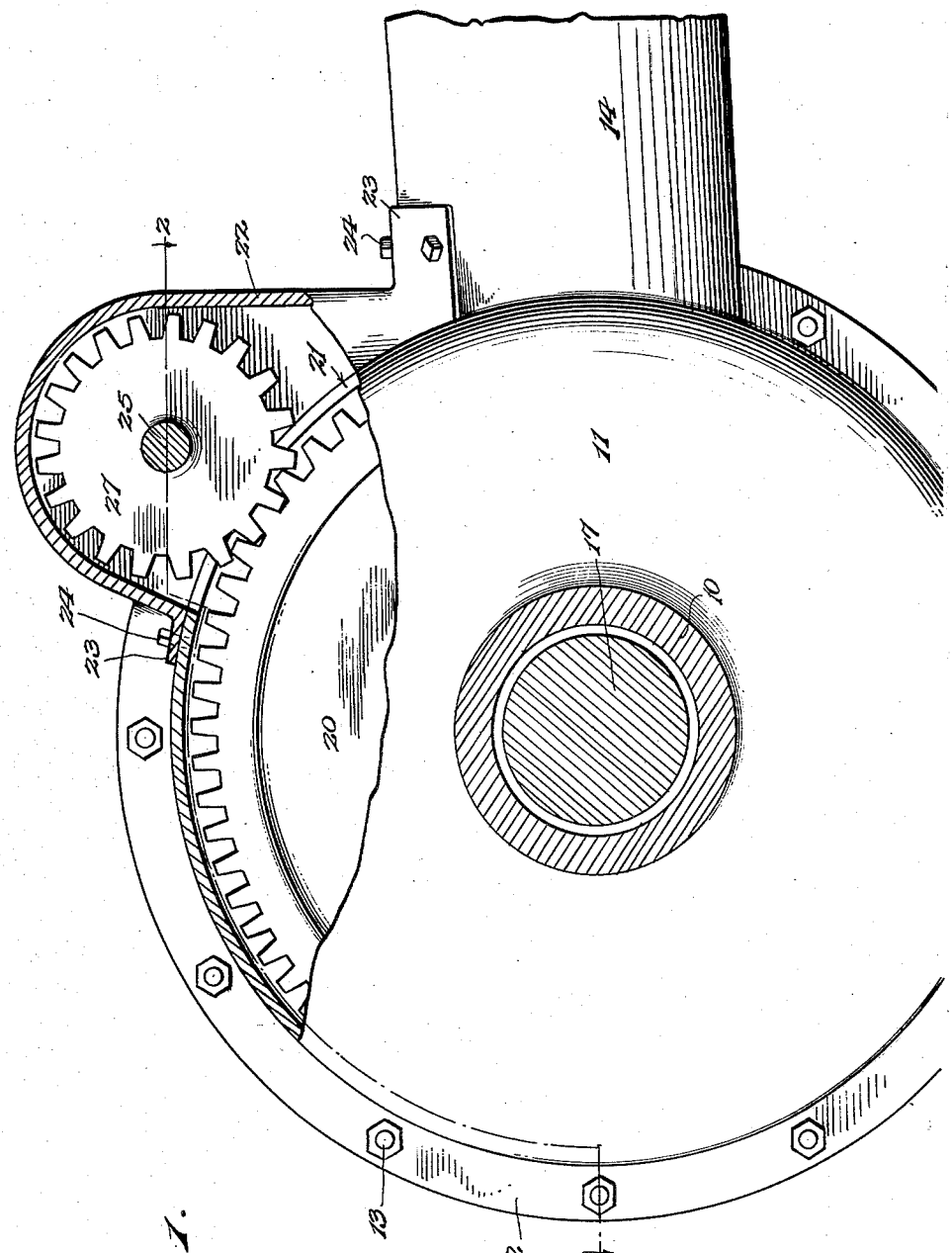

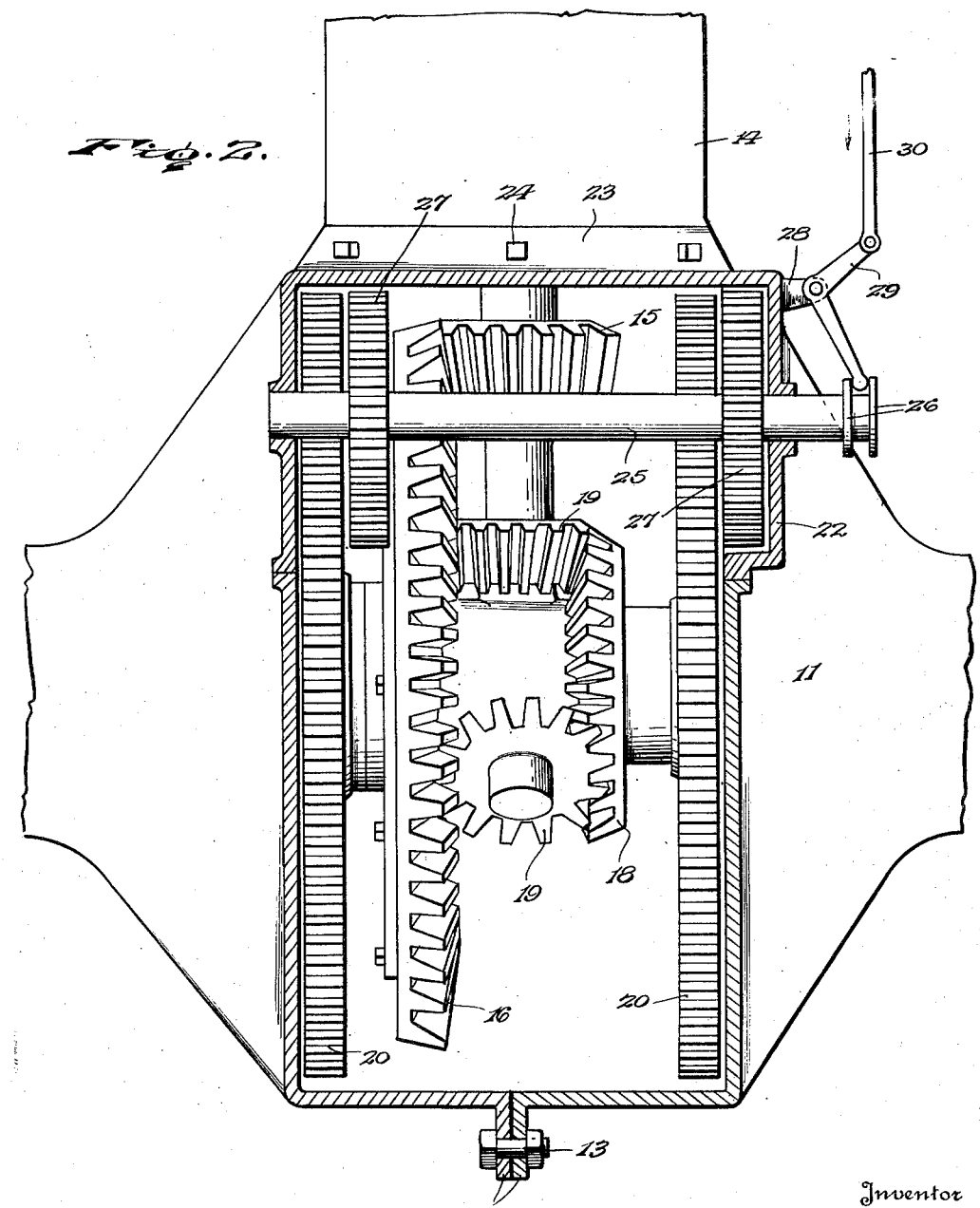

1,536,724

UNITED STATES PATENT OFFICE.

ROBERT G. NELSON, OF BELT, MONTANA, ASSIGNOR OF ONE-HALF TO CLINTON L. CRANE, AND ONE-HALF TO S. L. CRANE, BOTH OF ARMINGTON, MONTANA.

DIFFERENTIAL.

Application filed July 25, 1923. Serial No. 653,754.

*To all whom it may concern:*

Be it known that I, ROBERT G. NELSON, citizen of the United States, residing at Belt, in the county of Cascade and State of Montana, have invented certain new and useful Improvements in Differentials, of which the following is a specification.

This invention relates to an improved differential gear for motor vehicles and seeks, among other objects, to provide a differential wherein both the rear axle shafts of a vehicle may be directly coupled with the propeller shaft for positively turning both rear wheels of the vehicle so that, in the event one rear wheel becomes stuck or slips, the vehicle may be driven forwardly by means of the other rear wheel.

The invention seeks, as a further object, to provide improvements which may be readily embodied in conventional differential gears as now installed upon motor vehicles.

And the invention seeks, as a still further object, to provide means whereby the coupling or uncoupling of the rear axle shafts of the vehicle may be readily accomplished.

Other and incidental objects will appear hereinafter.

In the drawings:

Figure 1 is a side elevation embodying my invention, and

Figure 2 is a sectional view on the line 2—2 of Figure 1, looking in the direction of the arrows.

In carrying the invention into effect, I employ a rear axle housing 10 formed at its confronting ends with mating portions of a differential housing 11, the portions of the differential housing being provided with flanges 12 to receive bolts or other suitable fastening devices 13 securing the parts together. Extending from the forward side of the housing 11 is a roller bearing housing 14 through which extends an appropriate propeller shaft mounting a drive pinion 15 meshing with a ring gear 16. Journaled through the rear axle housing 10 are axle shafts 17 extending into the housing 11, and mounted upon said shafts at their confronting ends are differential gears 18. Coacting with said gears are differential pinions 19. As thus far described, the housings and differential gearing may be of any approved design and the structure thereof will not, therefore, be taken up in further detail.

Mounted upon the rear axle shaft 17 within the housing 11 are companion gears 20 of like diameter and formed in the housing at the upper forward portion thereof is an opening 21 exposing the gears. Formed to fit said housing over the opening 21 is a housing 22 provided at the front and rear sides thereof with flanges 23, one resting against the housing 11 and the other resting against the housing 14. Extending through said flanges are cap bolts or other suitable fastening devices 24 securing the housing 22 in position and journaled through the housing is a transversely disposed longitudinally movable counter-shaft 25 provided at one end thereof with spaced annular flanges 26. Fixed to the shaft 25 are companion pinions 27 of like diameter and extending from the housing 22 at one end thereof is an arm 28 upon which is pivoted a bell crank 29 engaging at one end between the flanges 26. Pivotally connected to the opposite end of the bell crank is a rod 30 which may be either manually or foot operated for rocking the bell crank. As will now be seen in view of the preceding description, the rod 30 may be shifted forwardly for moving the shaft 25 endwise and disposing the pinions 27 in inactive position, as shown in Figure 2, out of mesh with the gears 20, when the differential will function in the manner of an ordinary differential. However, by shifting the rod rearwardly, the pinions 27 may be moved to active position meshing with the gears 20 when the rear axle shafts 17 will be directly coupled with each other by the shaft 25. Accordingly, both rear wheels of the vehicle will then be positively driven so that should one wheel become stuck or should slip, the vehicle will be driven forwardly by the other rear wheel. The usual difficulty experienced in extricating a vehicle when mired or under other similar circumstances, will thus be overcome. It will be readily noted upon reference to the drawings, that the housing 22 forms a closure or cover for the opening through the differential casing, and this housing carries the countershaft 25 with the pinions 27 mounted thereon and the bell crank by which said countershaft is shifted. Accordingly, if, for any reason, access to the interior of the differential casing is desired, withdrawal of the cap bolts 24 will permit removal of the housing 22, the shaft 25, the pinions 27 and the means for shifting the said countershaft as a unit.

Having thus described the invention, what is claimed as new is:

1. A differential including a differential housing, axle shafts extending therein, a propeller shaft associated with the housing, a differential gearing forming a driving connection between the propeller shaft and said axle shafts, companion gears fixed to the axle shafts, companion pinions fixed relative to each other and shiftable in a path parallel with the axle shafts into mesh with said last mentioned gears whereby to couple the axle shafts with each other, and means secured to said housing forming a closure therefor and mounting said pinions, said means with the pinions thereon being bodily removable as a unit.

2. A differential including a differential housing, rear axle shafts extending therein, a propeller shaft associated with the housing, a differential gearing forming a driving connection between the propeller shaft and said axle shafts, companion gears fixed to the axle shafts, a longitudinally movable counter-shaft, companion gears fixed upon said counter-shaft, means for shifting the counter-shaft longitudinally and thereby moving said pinions into mesh with said last mentioned gears, and means secured to said housing forming a closure therefor and journaling said countershaft, said means with the countershaft and pinions being bodily removable as a unit.

3. A differential including a differential housing, rear axle shafts extending therein, a propeller shaft associated with the housing, a differential gearing forming a driving connection between the propeller shaft and said axle shafts, companion gears mounted upon the axle shafts, a housing connected to the differential housing forming a closure therefor, a longitudinally movable counter-shaft journaled in the latter housing and provided with relatively fixed companion pinions, and means for shifting said counter-shaft longitudinally and moving said pinions into mesh with said last mentioned gears, the latter housing with the countershaft and pinions being bodily removable as a unit.

4. A differential including a differential housing, axle shafts extending therein, a propeller shaft associated with the housing, a differential gearing forming a driving connection between the propeller shaft and said axle shafts, gears fixed to said axle shafts, a roller bearing housing extending forwardly from the differential housing, the differential housing being provided with an opening exposing said last mentioned gears, a housing fitting the differential housing over said opening to form a closure for the differential housing and provided at its rear side with a flange resting against the differential housing and at its forward side with a flange resting against the roller bearing housing, fastening devices extending through said flanges securing said last mentioned housing in position, a longitudinally movable counter-shaft journaled in the latter housing and provided with relatively fixed companion pinions, and means for shifting the counter-shaft longitudinally and moving said pinions into mesh with said last mentioned gears, said last mentioned housing with said countershaft, pinions and said shifting means being bodily removable as a unit.

5. A differential including a differential housing, axle shafts extending therein, a propeller shaft associated with the housing, a differential gearing forming a driving connection between said propeller shaft and said axle shafts, gears on the axle shafts, a housing secured to the differential housing forming a closure therefor, a longitudinally movable counter-shaft journaled in the latter housing and provided with relatively fixed pinions, an arm projecting from the latter housing, and a bell crank pivoted upon said arm to coact with the counter-shaft and operable for shifting the counter-shaft longitudinally and moving said pinions into mesh with said gears, the latter housing with said countershaft, pinions, arm and bell crank being bodily removable as a unit.

In testimony whereof I affix my signature.

ROBERT G. NELSON. [L. S.]